United States Patent
Tachibana et al.

(10) Patent No.: US 9,551,828 B2
(45) Date of Patent: Jan. 24, 2017

(54) OPTICAL FIBER

(71) Applicant: SUMITOMO ELECTRIC INDUSTRIES, LTD., Osaka-shi, Osaka (JP)

(72) Inventors: Kumiko Tachibana, Yokohama (JP); Masuo Iida, Osaka (JP); Takashi Fujii, Yokohama (JP)

(73) Assignee: SUMITOMO ELECTRIC INDUSTRIES, LTD., Osaka-shi, Osaka (JP)

( * ) Notice: Subject to any disclaimer, the term of this patent is extended or adjusted under 35 U.S.C. 154(b) by 0 days.

(21) Appl. No.: 14/939,043

(22) Filed: Nov. 12, 2015

(65) Prior Publication Data
US 2016/0139332 A1    May 19, 2016

(30) Foreign Application Priority Data
Nov. 13, 2014  (JP) .................. 2014-230717

(51) Int. Cl.
| G02B 6/036  | (2006.01) |
| G02B 6/02   | (2006.01) |
| C08G 18/48  | (2006.01) |
| C08G 18/75  | (2006.01) |
| C08G 18/76  | (2006.01) |
| C08F 290/06 | (2006.01) |
| C09D 175/16 | (2006.01) |

(52) U.S. Cl.
CPC ....... *G02B 6/02395* (2013.01); *C08F 290/067* (2013.01); *C08G 18/4825* (2013.01); *C08G 18/755* (2013.01); *C08G 18/7621* (2013.01); *C09D 175/16* (2013.01)

(58) Field of Classification Search
None
See application file for complete search history.

(56) References Cited

U.S. PATENT DOCUMENTS

| 5,536,529 | A  | * | 7/1996  | Shustack ........... C03C 25/106 |
|           |    |   |         | 427/163.2                       |
| 7,729,564 | B2 | * | 6/2010  | Nakajima .......... C03C 25/106 |
|           |    |   |         | 385/1                           |
| 9,057,816 | B2 | * | 6/2015  | Hinoshita ......... G02B 6/02395|
| 9,169,156 | B2 | * | 10/2015 | Tachibana ......... C03C 25/106 |
| 2006/0105169 | A1 | * | 5/2006 | Greer ............... C03C 25/102 |
|           |    |   |         | 428/375                         |
| 2011/0135269 | A1 | * | 6/2011 | Kim ................. C08G 18/4018 |
|           |    |   |         | 385/141                         |
| 2011/0274396 | A1 | * | 11/2011 | Nakajima ......... G02B 6/4403 |
|           |    |   |         | 385/114                         |
| 2012/0163759 | A1 |   | 6/2012 | Hinoshita et al.               |
| 2012/0189257 | A1 | * | 7/2012 | Kasahara .......... C03C 25/106 |
|           |    |   |         | 385/114                         |

(Continued)

FOREIGN PATENT DOCUMENTS

JP    2012-136401 A    7/2012

*Primary Examiner* — Rhonda Peace
(74) *Attorney, Agent, or Firm* — Drinker Biddle & Reath LLP

(57) ABSTRACT

The present invention relates to an optical fiber containing a glass fiber and a resinous coating layer that covers a periphery of the glass fiber, in which the resinous coating layer contains an ethanol of 10 mg or less or a methanol of 2 mg or less per gram of the resinous coating layer.

6 Claims, 1 Drawing Sheet

(56) References Cited

U.S. PATENT DOCUMENTS

2014/0308013 A1* 10/2014 Tachibana ............. C03C 25/106
                                                    385/100
2016/0139332 A1* 5/2016 Tachibana .......... G02B 6/02395
                                                    385/128

* cited by examiner

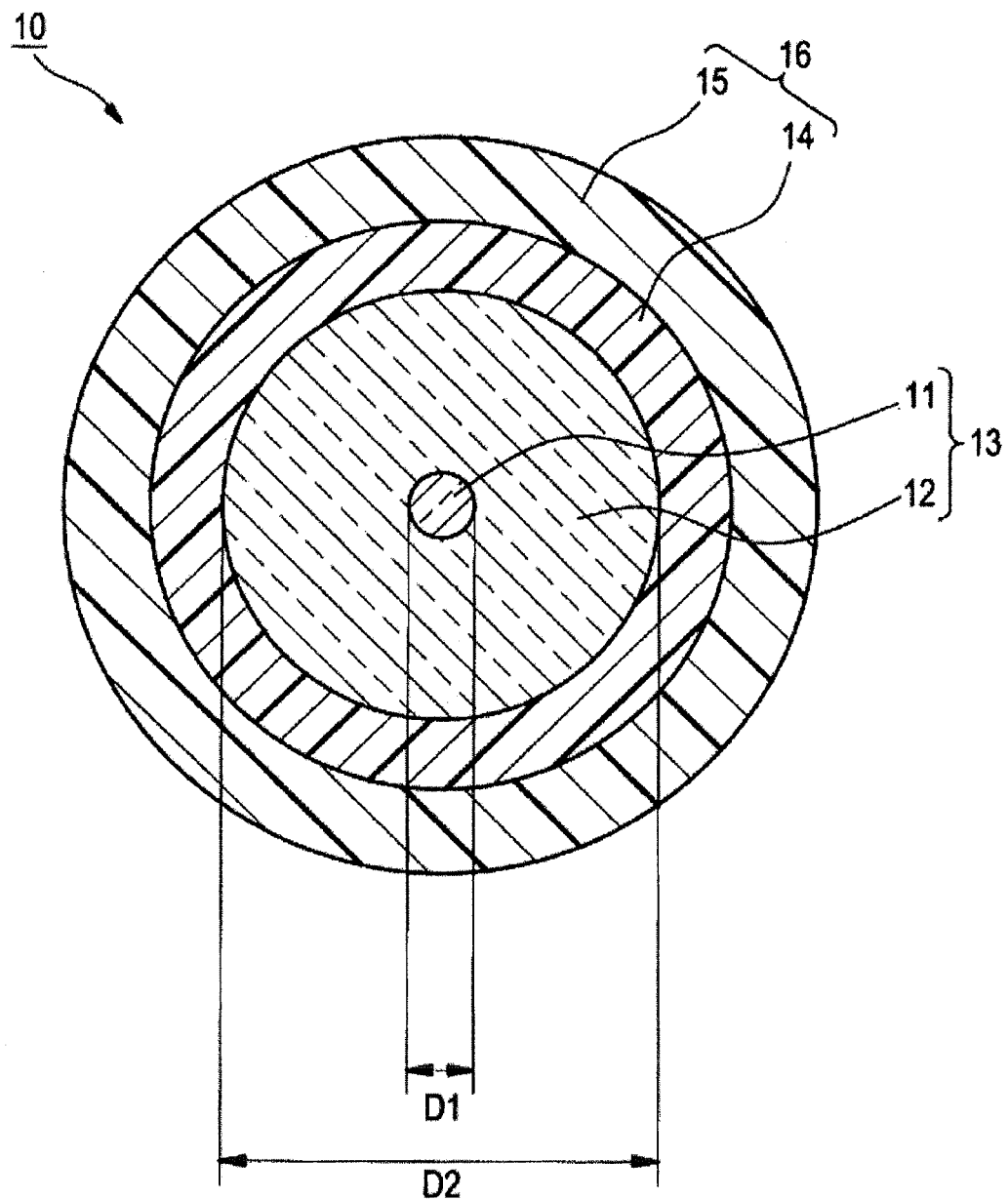

OPTICAL FIBER

TECHNICAL FIELD

The present invention relates to an optical fiber including a glass fiber and a resinous coating layer formed on the periphery of the glass fiber.

BACKGROUND ART

Patent Document 1 discloses an optical fiber containing an optical glass fiber having a core and a cladding and a resinous coating layer covering the periphery of the optical glass fiber, in which the resinous coating layer is formed so as to have a three-layer structure composed of a primary layer of a two-layer structure and a secondary layer disposed on the periphery of the primary layer in order to improve tensile strength of the optical fiber.

Patent Document 1: JP-A-2012-136401

SUMMARY OF THE INVENTION

However, in the optical fiber disclosed in Patent Document 1, the resinous coating layer includes one extra layer as compared with that in the ordinary optical fibers which has two resinous coating layer composed of one primary layer and one secondary layer. Therefore, for producing the optical fiber disclosed in Patent Document 1, it is necessary to add extra apparatus for application, curing, etc. for forming the additional layer of the resinous coating layer, resulting in an increase in cost.

An object of the present invention is to provide an optical fiber having high tensile strength, without increasing the number of layers in the resinous coating layer and without causing an increase in production cost.

The present invention provides an optical fiber containing a glass fiber and a resinous coating layer that covers a periphery of the glass fiber.

The resinous coating layer contains an ethanol of 10 mg or less or a methanol of 2 mg or less per gram of the resinous coating layer.

According to the present invention, it is possible to provide an optical fiber having high tensile strength, without increasing the number of layers in the resinous coating layer and without causing an increase in production cost.

BRIEF DESCRIPTION OF THE DRAWING

FIG. 1 is a diagrammatic cross-sectional view illustrating one embodiment of the optical fiber of the present invention.

MODES FOR CARRYING OUT THE INVENTION (1) The optical fiber according to the present invention is an optical fiber containing a glass fiber and a resinous coating layer that covers a periphery of the glass fiber. The resinous coating layer contains an ethanol of 10 mg or less or a methanol of 2 mg or less per gram of the resinous coating layer.

Usually, the resinous coating layer of an optical fiber is formed by applying a curable resin composition containing a silane coupling agent to the periphery of a glass fiber and then curing the composition.

The silane coupling agent contained in the resin composition undergoes a sol-gel reaction with silanol groups present on the glass fiber surface to thereby form tenacious bonds between the glass fiber and the resinous coating layer.

Meanwhile, when the silane coupling agent undergoes a sol-gel reaction with silanol groups present on the glass fiber surface, an alcohol is produced from the alkoxy group(s) possessed by the silane coupling agent. For example, in the case where the silane coupling agent used has methoxy groups, methanol is formed; and in the case where the silane coupling agent used has ethoxy groups, ethanol is formed.

It is presumed that the alcohol formed cuts the bonding chains between the silane coupling agent and the glass fiber surface. This cutting is presumed to bring about a decrease in the tensile strength of the optical fiber. It is also presumed that, of the alcohols formed, the methanol has a higher ability to cut the bonding chains than the ethanol.

In the present invention, therefore, the content of ethanol in the resinous coating layer of the optical fiber has been reduced to 10 mg or less per gram of the resinous coating layer, or the content of methanol in the resinous coating layer of the optical fiber has been reduced to 2 mg or less per gram of the resinous coating layer. It is presumed that due to this, the cutting of the bonding chains between the silane coupling agent and the glass fiber surface can be inhibited and the tensile strength may not be decreased, that is, can be maintained high.

(2) It is preferable that in the optical fiber according to the present invention, the resinous coating layer contains a silicon of less than 0.1 mg in an uncured resin being contained in a gram of the resinous coating layer. This means that the amount of a silane coupling agent contained in the uncured component is small, and thereby the increase of transmission loss of the optical fiber can be suppressed, when the optical fiber is immersed in hot water.

(3) It is preferable that in the optical fiber according to the present invention, the resinous coating layer contains a primary resinous coating layer that covers the periphery of the optical fiber and a secondary resinous coating layer that covers a periphery of the primary resinous coating layer.

(4) The optical fiber according to the present invention may further contain a colored layer.

Embodiments of the present invention will be explained below in detail by reference to FIG. 1.

FIG. 1 is a diagrammatic cross-sectional view illustrating one embodiment of the optical fiber of the present invention.

The optical fiber 10 of this embodiment contains a glass fiber 13 and a resinous coating layer 16 being disposed on the periphery of the glass fiber 13. The resinous coating layer 16 contains an inner layer (primary resinous coating layer) 14 and an outer layer (secondary resinous coating layer) 15 each of which has been formed from an ultraviolet ray-curable resin composition (hereinafter also referred to simply as "resin composition"). The glass fiber 13 is composed of a core part 11 and a cladding part 12.

The core part 11 can be made of, for example, quartz to which germanium is doped. The cladding part 12 can be made of, for example, either pure quartz or quartz to which fluorine is doped.

In FIG. 1, the diameter (D2) of the glass fiber 13 may be about 125 μm. The diameter (D1) of the core part 11 is preferably about from 7 μm to 15 μm. The resinous coating layer 16 is composed of two layers, the inner layer 14 and the outer layer 15. The total thickness of the resinous coating layer 16 is usually about 60 μm, and the respective thicknesses of the inner layer 14 and outer layer 15 are substantially the same and may be from 20 μm to 40 μm each.

The resinous coating layer 16 has an ethanol content of 10 mg or less or a methanol content of 2 mg or less per gram of the resinous coating layer 16. It is preferable that the resinous coating layer 16 contains ethanol of 10 mg or less and methanol of 2 mg or less per gram of the resinous coating layer 16. This means that even in the case where a silane coupling agent having an ethoxy group is included in the resinous coating layer 16, the obtained resinous coating layer 16 contains ethanol of 10 mg or less per gram of the resinous coating layer 16 in the present invention; even in the case where a silane coupling agent having a methoxy group is included in the resinous coating layer 16, the obtained resinous coating layer 16 contains methanol of 2 mg or less per gram of the resinous coating layer 16 in the present invention; and preferably, even in the case where any type of silane coupling agent is included in the resinous coating layer 16, the obtained resinous coating layer 16 contains ethanol of 10 mg or less and methanol of 2 mg or less per gram of the resinous coating layer 16 in the present invention.

As described above, the ethanol or methanol (hereinafter also referred to simply as "alcohol") is produced from a silane coupling agent. The silane coupling agent is an ingredient for imparting appropriate adhesion between the resinous coating layer 16 and the glass fiber 13, and is contained in the resin composition for inner-layer formation. Although the alcohol produced from the silane coupling agent hence is mostly contained in the inner layer 14, there can be cases where some of the alcohol migrates into the outer layer 15. Consequently, in the present invention, the content of the alcohol in the resinous coating layer 16 including the outer layer 15 is specified.

The alcohol content in the resinous coating layer 16 can be determined with a gas chromatograph mass spectrometer (GCMS).

In the present embodiment, the resin compositions for forming the resinous coating layer contain the following base resin.

The base resin is not particularly limited so long as the resin has ultraviolet ray curability. For example, preferred is one which contains an oligomer, a monomer, a photoinitiator, and a silane coupling agent. An antioxidant, a sensitizer (photosensitizer), or the like may be further added thereto. The silane coupling agent may be contained in the resin composition for inner-layer formation. The resin composition for outer-layer formation may contain no silane coupling agent.

Examples of the oligomer include urethane acrylates, epoxy acrylates, and mixtures thereof.

Examples of the urethane acrylates include ones obtained by reacting a polyol compound, a polyisocyanate compound, and a hydroxyl group-containing acrylate compound.

Examples of the polyol compound include poly(tetramethylene glycol) and poly(propylene glycol). Examples of the polyisocyanate compound include 2,4-tolylene diisocyanate and isophorone diisocyanate. Examples of the hydroxyl group-containing acrylate compound include 2-hydroxyethyl acrylate, 2-hydroxybutyl acrylate, 1,6-hexanediol monoacrylate, pentaerythritol triacrylates, and 2-hydroxypropyl acrylate.

Examples of the monomer include N-vinyl monomers having a cyclic structure, such as N-vinylpyrrolidone, N-vinylcaprolactam, and acryloylmorpholine. These monomers are preferred because the inclusion thereof results in an improvement in curing rate. Additionally, use can be made of monofunctional monomers such as isobornyl acrylate, tricyclodecanyl acrylate, benzyl acrylate, dicyclopentanyl acrylate, 2-hydroxyethyl acrylate, phenoxyethyl acrylate, and poly(propylene glycol)monoacrylate, and polyfunctional monomers such as poly(ethylene glycol)diacrylate and tricyclodecanediyldimethylene diacrylate.

Examples of the photoinitiator include 1-hydroxycyclohexyl phenyl ketone, 2,2-dimethoxy-2-phenylacetophenone, 1-(4-isopropylphenyl)-2-hydroxy-2-methylpropan-1-one, and 2,4,4-trimethylpentyiphosphine oxide. An antioxidant, a photosensitizer or the like may be added.

It is preferred to use, for example, a silane coupling agent represented by the following general formula (1) or (2). Alternatively, both (1) and (2) may be used.

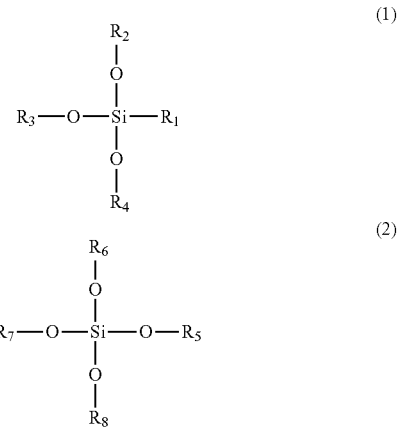

In general formulae (1) and (2), $R_1$ represents either a group which can react with an acryloyl group upon irradiation with ultraviolet rays or an acryloyl group, and $R_2$ to $R_8$ may be the same or different and each independently represents an alkyl group having one or more carbon atoms.

Examples of the group that can react with an acryloyl group upon irradiation with ultraviolet rays, which is represented by $R_1$ in general formula (1), include a mercapto group and mercaptoalkyl groups.

$R_2$ to $R_8$ in general formulae (1) and (2) may be the same or different, and are not particularly limited so long as they are alkyl groups having one or more carbon atoms. However, the number of carbon atoms thereof is preferably 4 or less, and may be 1 or 2. Examples of $R_2$ to $R_8$ include methyl group, ethyl group, propyl group, and butyl group. It is preferable that at least one of $R_2$ to $R_4$ is an alkyl group having 1 or 2 carbon atoms, and that at least one of $R_5$ to $R_8$ is an alkyl groups having 1 or 2 carbon atoms.

Specific examples of the silane coupling agent represented by general formula (1) include 3-mercaptopropyltrimethoxysilane, acryloyltrimethoxysilane, 3-mercaptopropyltriethoxysilane, acryloyltriethoxysilane, 3-mercaptopropyltripropoxysilane, and acryloyltripropoxysilane.

Specific examples of the silane coupling agent represented by general formula (2) include tetramethoxysilane, tetraethoxysilane, and tetrapropoxysilane.

In the present embodiment, for regulating the ethanol content to 10 mg or less or the methanol content to 2 mg or less per gram of the resinous coating layer, for example, the kind or the amount (concentration) of the silane coupling agent to be contained in the resin composition for forming the inner layer 14 may be suitably selected, and the atmosphere for conducting the silane coupling reaction at the time of forming the inner layer 14 may be appropriately controlled. In order to accelerate the reaction, it is effective to increase the reaction temperature and humidity. The reaction humidity is more predominant than the reaction temperature.

More specifically, it is effective that the amount (concentration) of the silane coupling agent to be contained in the resin composition for forming the inner layer 14 is regulated so as not to be unnecessarily large and that the temperature and humidity of the atmosphere for the silane coupling reaction are regulated so as not to be unnecessarily high.

In the present embodiment, a colored layer may be further disposed on the periphery of the outer layer 15.

EXAMPLES

The results of evaluation tests involving Examples according to the present invention and Comparative Examples are shown below to explain the present invention in more detail. The present invention, however, should not be construed as being limited to the following Examples.
(Production of Optical Fiber 10)

The glass fiber 13 used was one composed of quartz as the main component and having a core diameter (D1) of 8 μm and a cladding diameter (D2) of 125 μm (relative refractive index difference between the core and the cladding Δn was 1.0%). A resin composition for inner-layer formation and a resin composition for outer-layer formation having the following respective composition (Tables 1 and 2, respectively) were applied and cured on the periphery of the glass fiber 13 to form two layers (an inner layer 14 and an outer layer 15) covering the glass fiber 13, thereby forming a resinous coating layer 16. Thus, an optical fiber 10 was produced. The inner layer 14 was formed in a thickness of 35 μm, and the outer layer 15 was formed in a thickness of 25 μm.

TABLE 1

| Resin Composition for Inner-layer Formation | Amount |
|---|---|
| Urethane acrylate obtained by reacting poly(propylene glycol) diol with diisocyanate and hydroxy acrylate | 65 parts by mass |
| Nonylphenyl acrylate | 12 parts by mass |
| Isobornyl acrylate | 14 parts by mass |
| N-Vinylcaprolactam | 7.5 parts by mass |
| 2,4,4-Trimethylbenzoyl diphenyl phosphine oxide (photoinitiator) | 2.5 parts by mass |
| Silane coupling agent shown in Table 3 | the amount in mass % shown in Table 3, based on the resin composition for inner-layer formation |

TABLE 2

| Resin Composition for Outer-layer Formation | Amount |
|---|---|
| Urethane acrylate obtained by reacting poly(propylene glycol) diol with diisocyanate and hydroxy acrylate | 50 parts by mass |
| Epoxy acrylate | 20 parts by mass |
| Isobornyl acrylate | 10 parts by mass |
| N-Vinylpyrrolidone | 5 parts by mass |
| Ethoxylated nonylphenyl acrylate | 15 parts by mass |
| 1-Hydroxycyclohexyl phenyl ketone (photoinitiator) | 2 parts by mass |

The results of evaluation (alcohol content in the resinous coating layer and tensile strength) of the optical fibers 10 are shown in Table 3.
(Alcohol Content in Resinous Coating Layer 16)

The alcohol content in the resinous coating layer 16 was determined with a GCMS. Specifically, 25 mg of the optical fiber (in which the resinous coating accounted for 15 mg) was placed in a vial and heated at 100° C. for 20 minutes. Subsequently, all the gases within the vial were examined with the GCMS. The alcohol amount was determined by using a calibration curve drawn beforehand, and the content per gram of the resinous coating was calculated.
(Tensile Strength)

By using a tensile tester, the tensile strength of the optical fiber 10 was measured in accordance with the requirements Telcordia GR-20-CORE.

Before the tensile strength measurement, the optical fiber 10 was placed in an atmosphere of 23° C. and 50% RH for 12 hours, and was then examined for tensile strength in the same atmosphere. Tensile strength values of 5.7 kg or higher were indicated by A, ones of 5.5 kg or higher but less than 5.7 kg were indicated by B, and ones less than 5.5 kg were indicated by C.
(Loss Increase Due to Hot Water)

A fiber ribbon produced by using the optical fiber 10 was immersed in 60° C. hot water for 30 days. The transmission loss of the fiber ribbon at a wavelength of 1.55 μm was measured before and after the 30-day immersion in accordance with the OTDR method. From the loss levels measured, the increase in loss (Δα) due to the hot water was calculated by using the following equation. In Table 3, the case where Δα was 0.03 dB/km or less is indicated by A, the case where Δα was larger than 0.03 dB/km but not larger than 0.05 dB/km is indicated by B, and the case where Δα was larger than 0.05 dB/km is indicated by C.

Δα (dB/km)=[loss (after 30-day immersion in 60° C. hot water)]−[loss (before immersion)]     Equation (Si Content in Uncured Components of Resinous Coating Layer 16)

The optical fiber 10 was extracted with acetone (at 50° C. for 12 hours) to thereby recover the uncured resin. To the recovered uncured components was added 15 mL of sulfuric acid. This mixture was heated to 350° C. to carbonize the components, and 4 mL of nitric acid was then added thereto. After having become transparent, the solution was transferred to a beaker to vaporize the liquid. To the residue were added water, hydrochloric acid, and nitric acid in an amount of 5 mL each. This mixture was heated at 200° C. to dissolve the residue. After the dissolution, water was added to adjust the total volume to 50 mL. This solution was examined for Si amount by ICP. This amount of Si reflects the amount of the silane coupling agent contained in the uncured components of the resinous coating of the optical fiber.

TABLE 3

| | | Ex. 1 | Ex. 2 | Ex. 3 | Ex. 4 | Ex. 5 | Ex. 6 |
|---|---|---|---|---|---|---|---|
| Silane coupling agent | tetraethoxysilane (wt %) | 3 | 0 | 0 | 0 | 4.5 | 0 |
| | 3-mercaptopropyl-trimethoxysilane (wt %) | 0 | 3 | 3 | 3 | 0 | 4.5 |

TABLE 3-continued

|  | Ex. 1 | Ex. 2 | Ex. 3 | Ex. 4 | Ex. 5 | Ex. 6 |
| --- | --- | --- | --- | --- | --- | --- |
| Ethanol content (mg/1 g of coating layer) | 10 | 0 | 0 | 0 | 15 | 0 |
| Methanol content (mg/1 g of coating layer) | 0 | 2 | 1 | 0.2 | 0 | 3 |
| Si content (mg/uncured components in 1 g of coating layer) | 0.01 | 0.01 | 0.06 | 0.1 | 0.01 | 0.01 |
| Tensile Strength | A | A | B | B | C | C |
| Loss increase due to hot water | A | A | B | C | A | A |

In Example 1, ethanol was formed due to a silane coupling agent having ethyl groups in the resin composition for inner layer, but methanol was not formed.

In Example 2, methanol was formed due to the use of a silane coupling agent having methyl groups in the resin composition for inner-layer formation, but ethanol formation did not occur.

Example 1 and Example 2 each showed a sufficiently high tensile strength since the alcohol content in the resinous coating layer was low. Further, the amount of the silane coupling agent contained in the uncured components of the resinous coating layer was small and, hence, the increase in transmission loss after the 30-day immersion in 60° C. hot water was slight.

Examples 3 and 4 are results of examinations in which the optical fiber placed in storage environments differing from that in Example 2 (differing in temperature and humidity, i.e., Example 3 was lower in humidity than Example 2, and Example 4 was the lowest in humidity among these three Examples) was examined. Example 3 gave results in which the tensile strength and the loss increase due to hot water were in permissible ranges. Example 4 showed a tensile strength which was in the permissible range, but the loss increase due to hot water was large. The amount of Si contained in the uncured components of the resinous coating layer was large, and it is considered that the silane coupling agent had not reacted sufficiently. This is considered to be the cause of the results in which the tensile strength was not so high and in the permissible range, but the loss increase due to hot water was large.

In Example 5, ethanol was detected in a large amount as compared with Example 1. The ethanol content was high, and the tensile strength was insufficient.

In Example 6, the methanol content was high and the tensile strength was insufficient, as compared with Example 2.

Although the present invention has been described in detail and by reference to the specific embodiments, it is apparent to one skilled in the art that various modifications or changes can be made without departing the spirit and scope of the present invention.

This application is based on Japanese Patent Application No. 2014-230717 filed on Nov. 13, 2014, the contents of which are incorporated herein by reference.

DESCRIPTION OF THE REFERENCE NUMERALS AND SINGS

10 Optical fiber
11 Core part
12 Cladding part
13 Glass fiber
14 Inner layer
15 Outer layer
16 Resinous coating layer

What is claimed is:

1. An optical fiber comprising a glass fiber and a resinous coating layer that covers a periphery of the glass fiber,
   wherein the resinous coating layer contains an ethanol of 10 mg or less or a methanol of 2 mg or less per gram of the resinous coating layer.

2. The optical fiber according to claim 1,
   wherein the resinous coating layer contains a silicon of less than 0.1 mg in an uncured resin being contained in a gram of the resinous coating layer.

3. The optical fiber according to claim 1,
   wherein the resinous coating layer comprises a primary resinous coating layer that covers the periphery of the optical fiber and a secondary resinous coating layer that covers a periphery of the primary resinous coating layer.

4. The optical fiber according to claim 1, further comprises a colored layer.

5. The optical fiber according to claim 2,
   wherein the resinous coating layer comprises a primary resinous coating layer that covers the periphery of the optical fiber and a secondary resinous coating layer that covers a periphery of the primary resinous coating layer.

6. The optical fiber according to claim 2, further comprises a colored layer.

* * * * *